(12) United States Patent
Zheng et al.

(10) Patent No.: US 8,919,780 B2
(45) Date of Patent: *Dec. 30, 2014

(54) BRUSH SEAL

(71) Applicant: General Electric Company, Schenectady, NY (US)

(72) Inventors: Xiaoqing Zheng, Niskayuna, NY (US); William Edward Adis, Scotia, NY (US); Bernard Arthur Couture, Jr., Guilderland, NY (US); Michael Dennis Mack, Ballston Spa, NY (US)

(73) Assignee: General Electric Company, Schenectady, NY (US)

(*) Notice: Subject to any disclaimer, the term of this patent is extended or adjusted under 35 U.S.C. 154(b) by 275 days.

This patent is subject to a terminal disclaimer.

(21) Appl. No.: 13/675,448

(22) Filed: Nov. 13, 2012

(65) Prior Publication Data
US 2013/0069317 A1 Mar. 21, 2013

Related U.S. Application Data

(63) Continuation of application No. 12/898,952, filed on Oct. 6, 2010, now Pat. No. 8,328,198.

(51) Int. Cl.
*F16J 15/44* (2006.01)
*F16J 15/16* (2006.01)
*F01D 11/00* (2006.01)
*F16J 15/32* (2006.01)

(52) U.S. Cl.
CPC ............... *F16J 15/16* (2013.01); *F01D 11/003* (2013.01); *F16J 15/3288* (2013.01); *F05D 2240/56* (2013.01)
USPC ........................................................ 277/355

(58) Field of Classification Search
CPC ........................................................ F16J 15/44
USPC ........................................................ 277/355
See application file for complete search history.

(56) References Cited

U.S. PATENT DOCUMENTS 5,090,710 A   2/1992  Flower
5,176,389 A   1/1993  Noone et al.
(Continued)

FOREIGN PATENT DOCUMENTS

WO     9714897 A2     4/1997
WO     0155625 A1     8/2001

OTHER PUBLICATIONS

Patel, Office Action Communication for U.S. Appl. No. 12/898,952 dated Mar. 20, 2012, 10 pages.
(Continued)

*Primary Examiner* — Vishal Patel
(74) *Attorney, Agent, or Firm* — Ernest G. Cusick; Hoffman Warnick LLC

(57) ABSTRACT

A brush seal and brush seal segment for use in a rotary device are provided. In one embodiment, the invention provides a brush seal comprising: a plurality of brush seal segments, each segment including: an arcuate fence; an arcuate backplate substantially circumferentially coextensive with the arcuate fence, the arcuate backplate including a first end and a second end; and a plurality of brush seal bristles between the arcuate backplate and the arcuate fence, the plurality of brush seal bristles being angled with respect to a radial axis of the arcuate backplate and at least one of the first end and the second end of the arcuate backplate; and a static member to which at least one of the plurality of brush seal segments is affixed.

18 Claims, 4 Drawing Sheets

(56) References Cited

U.S. PATENT DOCUMENTS

| | | |
|---|---|---|
| 5,474,305 A | 12/1995 | Flower |
| 5,799,952 A | 9/1998 | Morrison et al. |
| 5,961,280 A | 10/1999 | Turnquist et al. |
| 6,030,175 A | 2/2000 | Bagepalli et al. |
| 6,161,836 A | 12/2000 | Zhou |
| 6,250,641 B1 | 6/2001 | Dinc et al. |
| 6,318,728 B1 | 11/2001 | Addis et al. |
| 7,032,903 B1 | 4/2006 | Dalton et al. |
| 7,168,708 B2 | 1/2007 | Dalton et al. |
| 7,255,352 B2 | 8/2007 | Adis et al. |
| 7,410,173 B2 | 8/2008 | Justak |
| 2002/0071764 A1 | 6/2002 | Turnquist et al. |
| 2003/0042682 A1 | 3/2003 | Inoue |
| 2006/0006603 A1 | 1/2006 | Dalton et al. |
| 2007/0120327 A1 | 5/2007 | Justak |
| 2007/0214628 A1 | 9/2007 | Adis et al. |

OTHER PUBLICATIONS

Patel, Office Action Communication for U.S. Appl. No. 12/898,952 dated Jun. 13, 2012, 7 pages.

Patel, Notice of Allowance and Fee(s) Due for U.S. Appl. No. 12/898,952 dated Sep. 28, 2012, 8 pages.

BRUSH SEAL

CROSS-REFERENCE TO RELATED APPLICATIONS

This application is a continuation application of co-pending U.S. patent application Ser. No. 12/898,952, filed 6 Oct. 2010, which is hereby incorporated herein.

BACKGROUND OF THE INVENTION

Embodiments of the invention relate generally to brush seals and, more particularly, to segmented brush seals having a plurality of brush bristles angled with respect to an end of a backplate. Such an arrangement improves pressure balance and backplate support for the brush bristles, thereby preventing or reducing damage to brush bristles adjacent ends of the brush seal segments. Such an arrangement also reduces leakage through segment gaps to improve performance of the brush seal.

Known segmented brush seals may include segments having radially-oriented or angled brush bristles. The backplates of such segments typically have ends parallel to the brush bristles. Gaps will generally exist where segment ends meet to avoid arch-binding the segments in operation, resulting in increased brush seal radial clearance. As a consequence, there will be direct leakage paths through the gaps between brush seal segments, resulting in more leakage and a decrease in seal efficiency. In addition, brush bristles adjacent a segment end may fall into the gap and get damaged from lack of support and less pressure balancing and/or from rotor excursion, which both increases leakage and causes instability of nearby brush bristles, further decreasing the efficiency of the brush seal and inducing extensive bristle damage.

BRIEF DESCRIPTION OF THE INVENTION

A brush seal and brush seal segment for use in a rotary device are provided.

In one embodiment, the invention provides a brush seal comprising: a plurality of brush seal segments, each segment including: an arcuate fence; an arcuate backplate substantially circumferentially coextensive with the arcuate fence, the arcuate backplate including a first end and a second end; and a plurality of brush seal bristles between the arcuate backplate and the arcuate fence, the plurality of brush seal bristles being angled with respect to a radial axis of the arcuate backplate and at least one of the first end and the second end of the arcuate backplate; and a static member to which at least one of the plurality of brush seal segments is affixed.

In another embodiment, the invention provides a brush seal segment comprising: an arcuate fence; an arcuate backplate substantially circumferentially coextensive with the arcuate fence, the arcuate backplate including a first end and a second end; and a plurality of brush seal bristles between the arcuate backplate and the arcuate fence, the plurality of brush seal bristles being angled with respect to a radial axis of the arcuate backplate and at least one of the first end and the second end of the arcuate backplate.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements among the drawings.

DETAILED DESCRIPTION OF THE INVENTION

Figure 1:
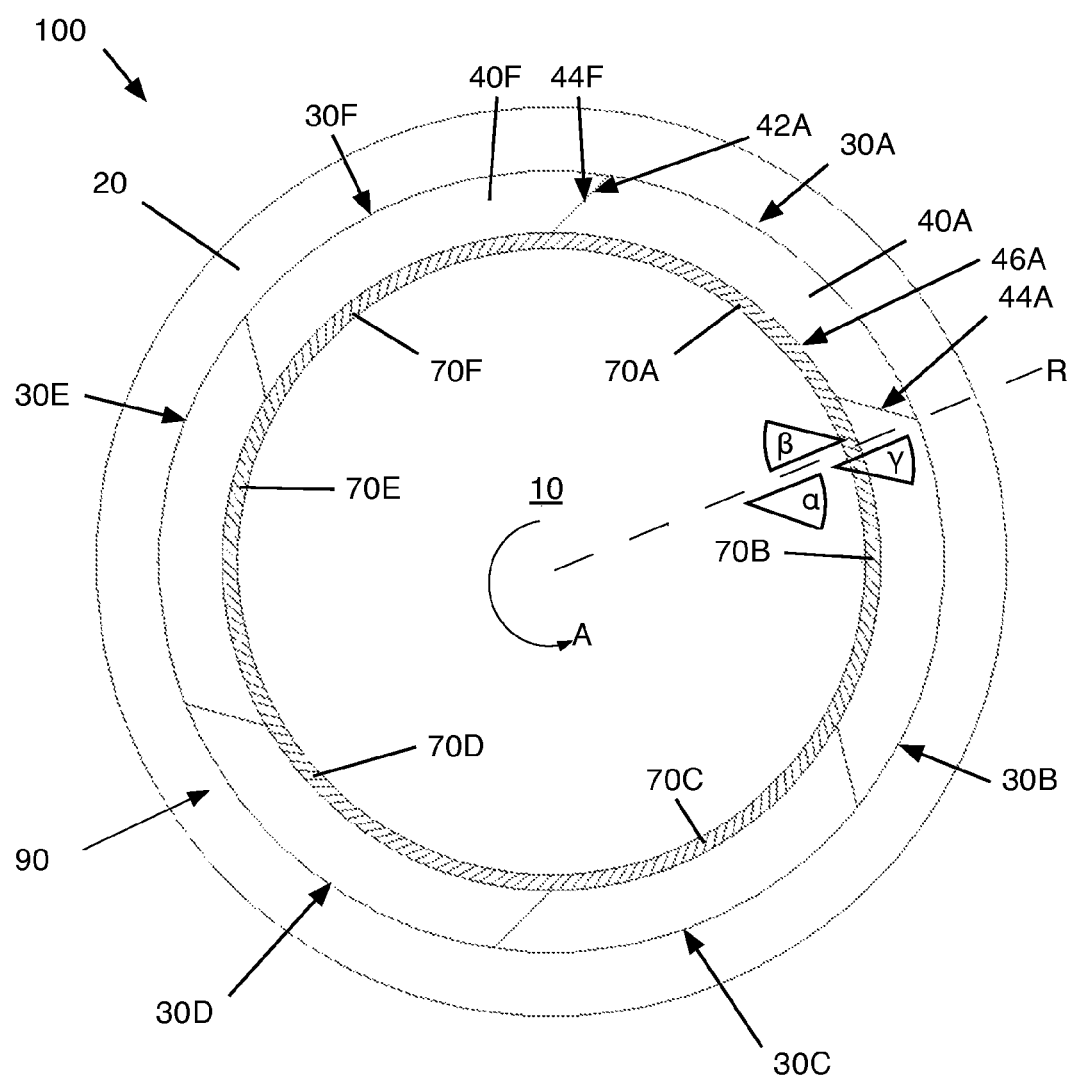
FIG. 1 shows a cross-sectional view of a rotary device having a brush seal and a rotor.

Turning now to the drawings, FIG. 1 shows a cross-sectional view of a rotary device 100 (e.g., gas turbine, steam turbine, generator, etc.) comprising a rotor 10 surrounded by a substantially circular static member 20 and a brush seal 90 therebetween. Brush seal 90 includes a plurality of segments 30A, 30B, 30C, 30D, 30E, 30F, one or more of which may be affixed to static member 20. Such a brush seal may include any number of segments, typically between two and 12 segments. For the sake of brevity, the segments will be described further with respect only to segment 30A.

Each segment 30A includes an arcuate fence 40A, an arcuate backplate (shown in subsequent figures and described further below), and a plurality of brush bristles 70A. The plurality of brush bristles 70A are disposed between fence 40A and the backplate, and extend beyond an inner arcuate edge 46A of fence 40A, such that brush bristles 70A may seal against rotor 10 as it rotates along path A.

As can be seen in FIG. 1, brush bristles 70A are angled at an angle α relative to a radial axis R of rotor 10, segment 30A, and static member 20. Similarly, a first end 42A and second end 44A of fence 40A are angled at an angle β and an angle γ, respectively, with respect to radial axis R. Although not essential, angles β and γ are typically the same, but they can be different from the bristles angle α. Such angles generally range, for example, from about 1° to about 60° with respect to radial axis R. As one skilled in the art will recognize, of course, in order for adjacent segments of brush seal 90 to properly align and provide a functional seal, a first end (e.g., 42A) of a first fence (e.g., 40A) must have an angle substantially the same as an angle of a second end (e.g., 44F) of an adjacent second fence (e.g., 40F).

Figure 2:
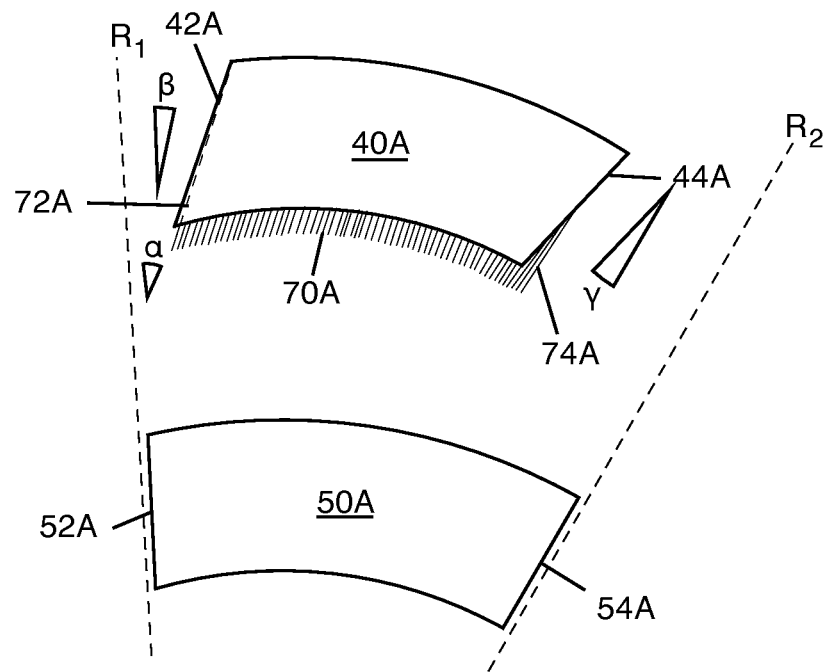
FIG. 2 shows portions of a brush seal segment according to an embodiment of the invention.

FIG. 2 shows a fence 40A, brush bristles 70A, and arcuate backplate 50A according to one embodiment of the invention. Arcuate backplate 50A is shown circumferentially coextensive with fence 40A. Brush bristles 70A, first end 42A, and second end 44A are angled, α, β, and γ, respectively, relative to radial axes $R_1$ and $R_2$. A first end 72A and second end 74A of bristles 70A are angled substantially at the same angle α. As shown in FIG. 2, angles β and γ are substantially the same. Backplate 50A includes a first end 52A and second end 54A, each of which is substantially parallel to a radial axis $R_1$, $R_2$, respectively.

Figure 3:
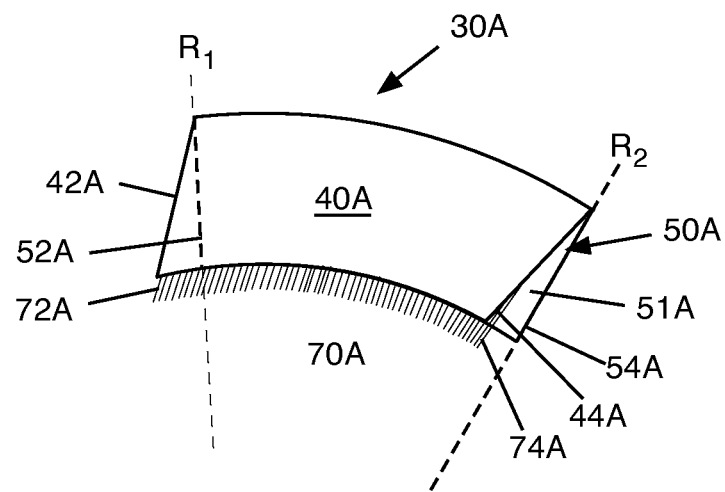
FIG. 3 shows a brush seal segment according to an embodiment of the invention.
Figure 4:
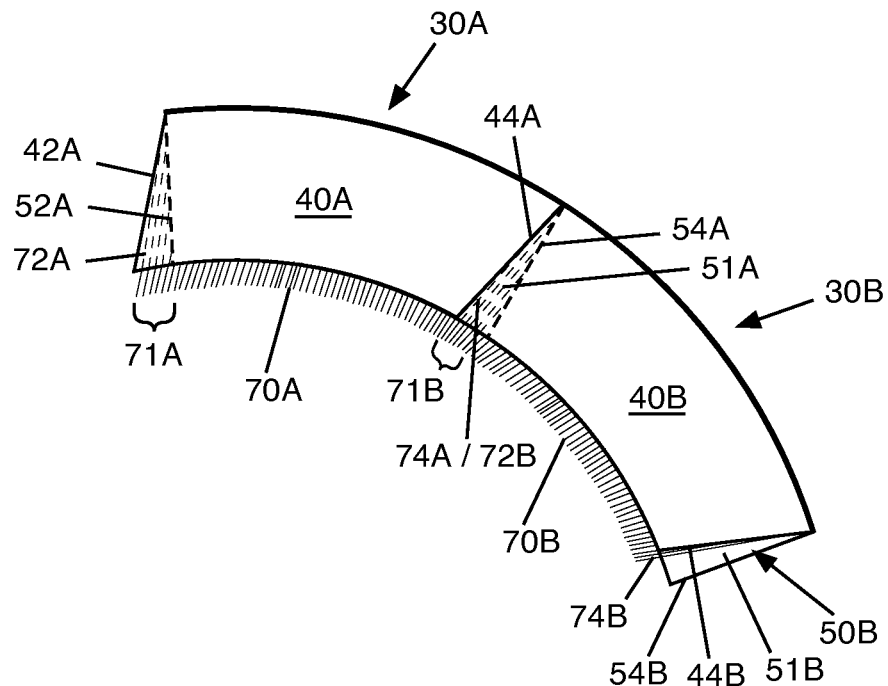
FIG. 4 shows a portion of a brush seal according to an embodiment of the invention.

FIG. 3 shows backplate 50A in place behind fence 40A and brush bristles 70A to form segment 30A. As can be seen in FIG. 2, a portion 51A of backplate 50A extends beyond second end 74A of the bristle pack. Portion 51A serves to support a portion of the brush bristles of an adjacent segment. Such an arrangement is shown in FIG. 4, where an extending portion 71B of brush bristles 70B is disposed in front of portion 51A of backplate 50A when segments 30A and 30B are in place. This stepped gap design is made possible by the angled ends 72A, 74A of bristles 70A combined with substantially radial ends 52A, 54A of backplate 50A.

Figure 5:
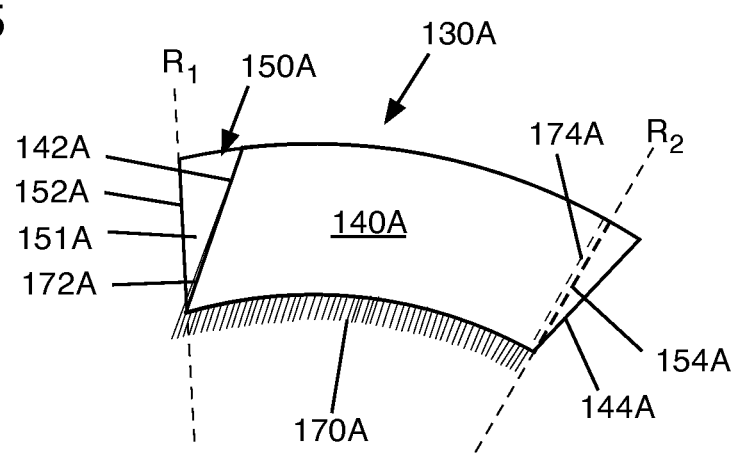
FIG. 5 shows a portion of a brush seal according to another embodiment of the invention.

Other embodiments incorporating a stepped gap design are possible, of course. For example, FIG. 5 shows an embodiment of the invention wherein portion 151A of backplate 150A extends beyond first end 142A of arcuate fence 140A, rather than beyond second end 144A, as would be the case in the embodiment shown in FIGS. 2-4.

Figure 6:
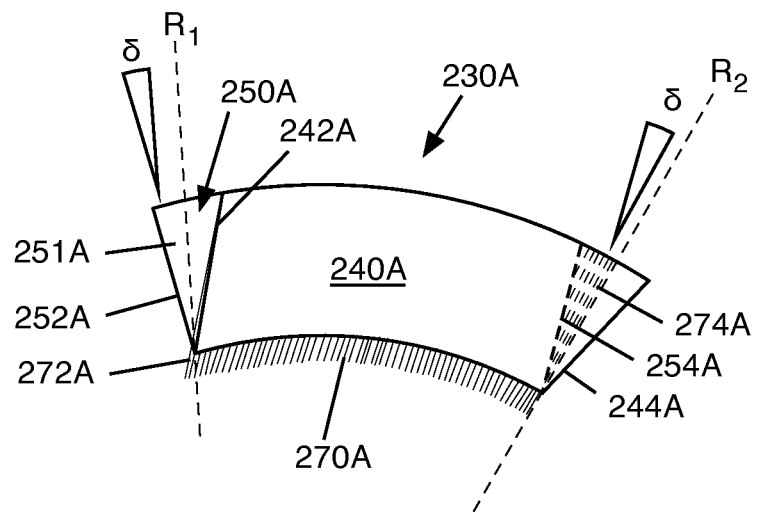
FIG. 6 shows a portion of a brush seal according to yet another embodiment of the invention.

In another embodiment of the invention, such as that shown in FIG. 6, first end 252A, second end 254A, or both, of backplate 250A may be angled δ relative to radial axes $R_1$, $R_2$, respectively. Typically, angle δ would be to a side of a radial axis opposite that of angle α. That is, angle α will typically be "positive" (as defined in the direction of rotor rotation) and angle δ "negative," (as against the rotor rotational direction), such that the "negative" angle δ increases portion 251A of backplate 250A extending beyond first end 272A of bristles 270A. As used herein, "positive" and "negative" are meant merely to illustrate opposite sides of a radial axis rather than any value of an angle relative to such an axis. Angle δ may have a value similar to that of angle α, i.e., between about 1° and about 60°, while β and γ may be the same as either bristle angle α or backplate end angle δ. For manufacturing reasons, the fence may have the same angle as the bristles and be aligned with the bristle pack along the segment ends.

Figure 7:
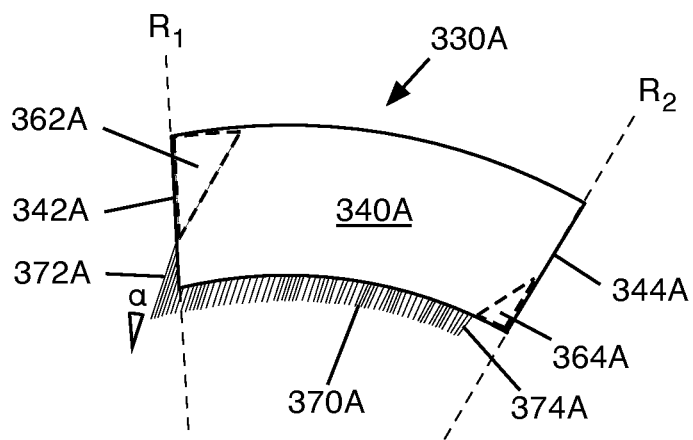
FIG. 7 shows a brush seal segment according to still another embodiment of the invention.

FIG. 7 shows a brush seal segment 330A according to another embodiment of the invention, wherein first end 342A and second end 344A of fence 340A are substantially parallel to radial axes $R_1$ and $R_2$, respectively, as are the ends of the backplate (not shown). That is, only brush bristles 370A are angled α with respect to radial axes $R_1$ and $R_2$. Such an arrangement forms a pair of voids 362A, 364A between fence 340A and the backplate, into which brush bristles from an adjacent segment may be inserted during assembly of the brush seal.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any related or incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A brush seal comprising:
    a plurality of brush seal segments, each segment including:
        an arcuate fence having a first end and a second end defining an outer circumference and an inner circumference;
        an arcuate backplate having a first end and a second end defining an outer circumference and an inner circumference, neither of which is co-extensive with the outer circumference or the inner circumference, respectively, of the arcuate fence; and
        a plurality of brush seal bristles between the arcuate backplate and the arcuate fence, the plurality of brush seal bristles being angled with respect to a radial axis of the arcuate backplate and at least one of the first end and the second end of the arcuate backplate; and
    a static member to which at least one of the plurality of brush seal segments is affixed.

2. The brush seal of claim 1, wherein the first end of the arcuate backplate includes:
    a first portion substantially co-extensive with a portion of the first end of the arcuate fence; and
    a second portion angled relative to first portion.

3. The brush seal of claim 2, wherein the second end of the arcuate backplate includes:
    a first portion substantially co-extensive with a portion of the second end of the arcuate fence; and
    a second portion angled relative to the first portion of the second end of the arcuate backplate.

4. The brush seal of claim 3, wherein both the first portion of the first end of the arcuate backplate and the first portion of the second end of the arcuate backplate are substantially parallel to radial axes of the arcuate backplate.

5. The brush seal of claim 4, wherein the plurality of brush seal bristles is positively angled with respect to the radial axis of the arcuate backplate.

6. The brush seal of claim 5, wherein at least one of the second portion of the first end of the arcuate backplate and the second portion of the second end of the arcuate backplate is substantially parallel to the brush seal bristles.

7. The brush seal of claim 4, wherein at least one of the second portion of the first end of the arcuate backplate and the second portion of the second end of the arcuate backplate is angled between about 1° and about 60° with respect to the radial axis of the arcuate backplate.

8. The brush seal of claim 1, wherein the plurality of brush seal bristles is angled between about 1° and about 60° with respect to the radial axis of the arcuate backplate.

9. The brush seal of claim 1, wherein at least one of a first end and a second end of the arcuate fence is substantially parallel to the radial axis.

10. A brush seal segment comprising:
    an arcuate fence having a first end and a second end defining an outer circumference and an inner circumference;
    an arcuate backplate having a first end and a second end defining an outer circumference and an inner circumference, neither of which is co-extensive with the outer circumference or the inner circumference, respectively, of the arcuate fence; and
    a plurality of brush seal bristles between the arcuate backplate and the arcuate fence, the plurality of brush seal bristles being angled with respect to a radial axis of the arcuate backplate and at least one of the first end and the second end of the arcuate backplate.

11. The brush seal segment of claim 10, wherein the first end of the arcuate backplate includes:

a first portion substantially co-extensive with a portion of the first end of the arcuate fence; and a second portion angled relative to first portion.

12. The brush seal segment of claim 10, wherein the second end of the arcuate backplate includes:

a first portion substantially co-extensive with a portion of the second end of the arcuate fence; and a second portion angled relative to the first portion of the second end of the arcuate backplate.

13. The brush seal segment of claim 12, wherein both the first portion of the first end of the arcuate backplate and the first portion of the second end of the arcuate backplate are substantially parallel to radial axes of the arcuate backplate.

14. The brush seal segment of claim 13, wherein the plurality of brush seal bristles is positively angled with respect to the radial axis of the arcuate backplate.

15. The brush seal segment of claim 14, wherein at least one of the second portion of the first end of the arcuate backplate and the second portion of the second end of the arcuate backplate is substantially parallel to the brush seal bristles.

16. The brush seal segment of claim 13, wherein at least one of the second portion of the first end of the arcuate backplate and the second portion of the second end of the arcuate backplate is angled between about 1° and about 60° with respect to the radial axis of the arcuate backplate.

17. The brush seal segment of claim 10, wherein the plurality of brush seal bristles is angled between about 1° and about 60° with respect to the radial axis of the arcuate backplate.

18. The brush seal segment of claim 10, wherein at least one of a first end and a second end of the arcuate fence is substantially parallel to the radial axis.

* * * * *